US009347486B2

(12) United States Patent
Takada et al.

(10) Patent No.: US 9,347,486 B2
(45) Date of Patent: May 24, 2016

(54) IC TAG EQUIPPED BEARING UNIT

(75) Inventors: Seiichi Takada, Kuwana (JP); Yukihiro Takeda, Kuwana (JP); Hideshi Nishiwaki, Kuwana (JP); Makoto Tanaka, Kuwana (JP)

(73) Assignee: NTN Corporation, Osaka (JP)

( * ) Notice: Subject to any disclaimer, the term of this patent is extended or adjusted under 35 U.S.C. 154(b) by 2344 days.

(21) Appl. No.: 11/578,089

(22) PCT Filed: Apr. 8, 2005

(86) PCT No.: PCT/JP2005/006926
§ 371 (c)(1),
(2), (4) Date: Oct. 12, 2006

(87) PCT Pub. No.: WO2005/100811
PCT Pub. Date: Oct. 27, 2005

(65) Prior Publication Data
US 2007/0223851 A1    Sep. 27, 2007

(30) Foreign Application Priority Data
Apr. 16, 2004  (JP) .................................. 2004-122114

(51) Int. Cl.
*F16C 41/00* (2006.01)
*F16C 19/52* (2006.01)
*F16C 35/06* (2006.01)
(Continued)

(52) U.S. Cl.
CPC ............... *F16C 19/52* (2013.01); *F16C 19/386* (2013.01); *F16C 35/06* (2013.01); *F16C 41/008* (2013.01); *G06K 19/07758* (2013.01); *H04Q 9/00* (2013.01); *H04Q 2209/10* (2013.01); *H04Q 2209/47* (2013.01)

(58) Field of Classification Search
USPC ................ 384/448; 340/572.1, 572.8, 426.33
See application file for complete search history.

(56) References Cited

U.S. PATENT DOCUMENTS 6,501,382 B1    12/2002  Rehfus et al.
2003/0030565 A1  2/2003  Sakatani et al.
(Continued)

FOREIGN PATENT DOCUMENTS

JP    2001-82461    3/2001
JP    2002-169858   6/2002
(Continued)

OTHER PUBLICATIONS

JP,2001-082461,A. AIPN Japan Patent Office. Jun. 16, 2010. <http://dossier1.ipdl.inpit.go.jp/AIPN/odse_call_transl.ipdl?N0000=7413&N0005=Ei7BzenZVnBvfz7D1ZIK&N0120=01&N2001=2&N3001=2001-082461&Ntt3=machineV13&Ntt4=industryV13&Ntt5=electronicsV13&Ntt6=&Ntt7=&Ntt8=&Ntt9=&Ntt10=&Ntt11=&Ntt12=>.*
(Continued)

*Primary Examiner* — Daniel Yabut
(74) *Attorney, Agent, or Firm* — Osha Liang LLP

(57) ABSTRACT

The bearing unit includes a bearing 1 and bearing unit forming component parts such as, for example, a housing 11 in which the bearing is incorporated, a shaft 19, covers 3 and 4 and a sealing member 10 for the housing. In this bearing unit, at least one of the bearing unit forming component parts is fitted with an IC tag 15 and an IC tag 16 is also fitted to the bearing 1. The IC tag 16 fitted to the bearing unit forming component part is of a read/write type whereas the IC tag 16 fitted to the bearing 1 is of a read-only type. The read-only IC tag 16 fitted to the bearing 1 is recorded with information necessary to correlate the bearing unit forming component part, to which the IC tag 15 is fitted, with the bearing unit 1.

2 Claims, 7 Drawing Sheets

(51) Int. Cl.
*H04Q 9/00* (2006.01)
*G06K 19/077* (2006.01)
*F16C 19/38* (2006.01)

(56) References Cited

U.S. PATENT DOCUMENTS

| | | |
|---|---|---|
| 2003/0048962 A1 | 3/2003 | Sato et al. |
| 2003/0218548 A1 | 11/2003 | Sato et al. |
| 2006/0167659 A1 | 7/2006 | Miyasaka et al. |

FOREIGN PATENT DOCUMENTS

| | | |
|---|---|---|
| JP | 2002-227863 | 8/2002 |
| JP | 2002-298116 | 10/2002 |
| JP | 2003-307228 | 10/2003 |
| JP | 2004-3601 | 1/2004 |
| JP | 2004-86683 | 3/2004 |
| JP | 2004-93256 | 3/2004 |
| JP | 2004-219160 | 8/2004 |
| JP | 2005-155735 | 6/2005 |
| JP | 2005-172153 | 6/2005 |
| WO | 02/101675 A1 | 12/2002 |
| WO | WO-02/101675 | 12/2002 |

OTHER PUBLICATIONS

JP,2001-082461,A. Japan Patent Office.http://dossier1.ipdl.inpit.go.jp/AIPN/odse_call_transl.ipdl?N0000=7413&N0005=Ei7BzenZVnBvfz7D1ZIK&N0120=01&N2001=2&N3001=2001-082461&Ntt3=machineV13&Ntt4=logisticsV13&Ntt5=productsV13&Ntt6=&Ntt7=&Ntt8=&Ntt9=&Ntt10=&Ntt11=&Ntt12=.*

[JP,2004-003601,A]. Japan Patent Office. http://dossier1.ipdl.inpit.go.jp/AIPN/odse_call_transl.ipdl?N0000=7413&N0005=Ei7BzenZVnBvfz7D1ZIK&N0120=01&N2001=2&N3001=2004-003601&Ntt3=machineV13&Ntt4=logisticsV13&Ntt5=industryV13&Ntt6=&Ntt7=&Ntt8=&Ntt9=&Ntt10=&Ntt11=&Ntt12=.*

Chinese Office Action for Chinese Application No. 200580011362, mailed on Dec. 28, 2007 (9 pages).

Patent Abstracts of Japan for Japanese Publication No. 2002-169858, Pubilcation date Jun. 14, 2002 (1 page).
Supplementary European Search Report for Application No. 05728514.0-2424, mailed on Jan. 20, 2010 (3 pages).
Japanese Notification of Reasons for Rejection for Application No. 2004-122114, mailed on Feb. 2, 2010 (3 pages).
International Search Report for PCT/JP2005/006926 dated Jun. 7, 2005 (2 pages).
Patent Abstracts of Japan 2001-082461 dated Mar. 27, 2001 (2 pages).
Patent Abstracts of Japan 2004-003601 dated Jan. 8, 2004 (2 pages).
Patent Abstracts of Japan 2004-086683 dated Mar. 18, 2004 (2 pages).
Patent Abstracts of Japan 2002-227863 dated Aug. 14, 2002 (2 pages).
Patent Abstracts of Japan 2003-307228 dated Oct. 31, 2003 (2 pages).
Patent Abstracts of Japan 2005-155735 dated Jun. 16, 2005 (2 pages).
Patent Abstracts of Japan 2005-172153 dated Jun. 30, 2005 (2 pages).
Patent Abstracts of Japan 2002-298116 dated Oct. 11, 2002 (2 pages).
Japanese Decision of Grant for patent application No. 2004-140272, dated Oct. 5, 2010, and English translation thereof, 6 pages.
Patent Abstracts of Japan for patent application with Publication No. 2004-219160, Publication Date: Aug. 5, 2004, 1 page.
EP Communication pursuant to Article 94(3) EPC, patent application No. 05 728 514.0, dated Sep. 6, 2010, 6 pages.
Notification of Reasons for Rejection for patent application No. 2004-140273, dated Jul. 13, 2010, and English translation thereof, 6 pages.
Notification of Reasons for Rejection for related patent application No. 2004-140272, dated Jul. 13, 2010, and English translation thereof, 4 pages.
English Patent Abstracts of Japan for patent application with Publication No. 2004-093256, Publication Date: Mar. 25, 2004, 1 page.
Notification of Reason(s) for Rejection issued for Japanese application No. 2004-140272, mailed Apr. 20, 2010, 3 pages.
Notification of Reason(s) for Rejection issued for Japanese application No. 2004-140273, mailed Apr. 20, 2010, 2 pages.
Decision of Rejection issued for Japanese application No. 2004-122114, mailed Apr. 20, 2010, 3 pages.

* cited by examiner

IC TAG EQUIPPED BEARING UNIT

BACKGROUND OF THE INVENTION

The present invention relates to an IC tag equipped bearing unit equipped with an IC tag capable of achieving a non-contact communication.

Hitherto, various pieces of information concerning the bearing itself, such as, for example, the specification of the bearing, have been marked by engraving on produced bearings themselves and/or printed on packaging boxes. However, contents that can be marked on the bearings and/or packaging boxes are limited to the minimum information required. Accordingly, it is suggested in, for example, the Japanese Patent Applications No. 2003-393361 (Japanese Laid-open Patent Publication No. 2005-155735) and No. 2003-414349 (Japanese Laid-open Patent Publication No. 2005-172153) to affix a compact RFID based IC tag affixed to various articles and utilizing the RFID (Radio Frequency Identification) technology capable of recording a much amount of information such as disclosed in, for example, the Japanese Laid-open Patent Publication No. 2002-298116) as a device for recording such pieces of information, to bearings. It is to be noted that the RFID based IC tag is available in two types, i.e., a type having a read-only capability and a type having a read/write capability.

SUMMARY OF THE INVENTION

However, in the case of the bearing affixed with the IC tag as described above, since the bearing is accommodated within a bearing housing once the bearing has been incorporated in an apparatus, the RFID information in the IC tag cannot be read out. In such case, there is a problem in that the apparatus has to be disassembled to remove the bearing, requiring complicated and time-consuming procedures.

An object of the present invention to provide an IC tag equipped bearing unit capable of allowing various pieces of information of the bearing to be read out even though such bearing is left as incorporated.

The IC tag equipped bearing unit of the present invention is such that a bearing unit including a bearing and bearing unit forming component parts such as, for example, a housing having the bearing incorporated therein, a shaft, covers and a sealing member for the housing, in which an IC tag is fitted to at least one of the bearing unit forming component parts and the bearing is provided with a marking indicating a combination of the bearing unit forming component parts and the bearing or an IC tag.

According to the above construction, with a specification information and/or a maintenance information of the bearing recorded in the IC tag attached to the bearing unit forming component part, the bearing specification and/or the maintenance information can easily be read out even when the information is read from the IC tag while the bearing is in a condition incorporated. Thereby, the workability of the maintenance can be improved. Also, if an identification information of the baring is recorded in the IC tag or the marking provided in the bearing, the identification information can be read out from the IC tag affixed to the bearing or the marking when the bearing unit once disassembled is again assembled, thereby alleviating an erroneous assemblage of the bearing unit.

It is to be noted that the IC tag to be affixed to the bearing unit forming component part may be either a type having a read-only capability or a type having a read/write capability. In the first case, if the identification information or the like is described on this IC tag and a table or the like, which corresponds to information recorded in the IC tag is prepared by the use of an information processing device such as, for example, a personal computer, the various information can be supervised relying on such table.

In the present invention, an IC tag of a read/write type may be fitted to one of the bearing unit forming component parts and a marking may then be applied to the bearing. In this case, information necessary to correlate the bearing and the bearing unit forming component part, to which the IC tag of the read/write type is fitted, is recorded on the IC tag of the read-only type fitted to the bearing.

In the case of this construction, each time the maintenance, for example, is performed, the maintenance information in the IC tag, fitted to the bearing unit forming component part, can be rewritten and/or additionally recorded and the up-to-date history can be ascertained at all times from the maintenance information read out from the IC tag. For this reason, the workability in maintenance can further be increased. Also, when the correlating information is read from the IC tag fitted to the bearing, it is possible to avoid an erroneous incorporation of the bearing. While the IC tag fitted to the bearing is of a read-only type, the IC tag fitted to the bearing have little requirement of being written and is preferred in terms of reliability better than the IC tag of a read/write type, which involves a possibility of the information being accidentally overwritten. Also, since the read-out type is compact and inexpensive, it is preferred in terms of securement of a fitting site and economy as an IC tag to be fitted to the bearing.

Where the marking is provided in the bearing, such marking is preferably an engraved mark containing identification information of the bearing. In such case, the IC tag of the read/write type may be fitted to the bearing unit forming component part and may then be recorded with information of the marking. In this way, a combination of the bearing unit forming component part and the bearing can easily and accurately determined.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF THE PREFERED EMBODIMENTS

Figure 2:
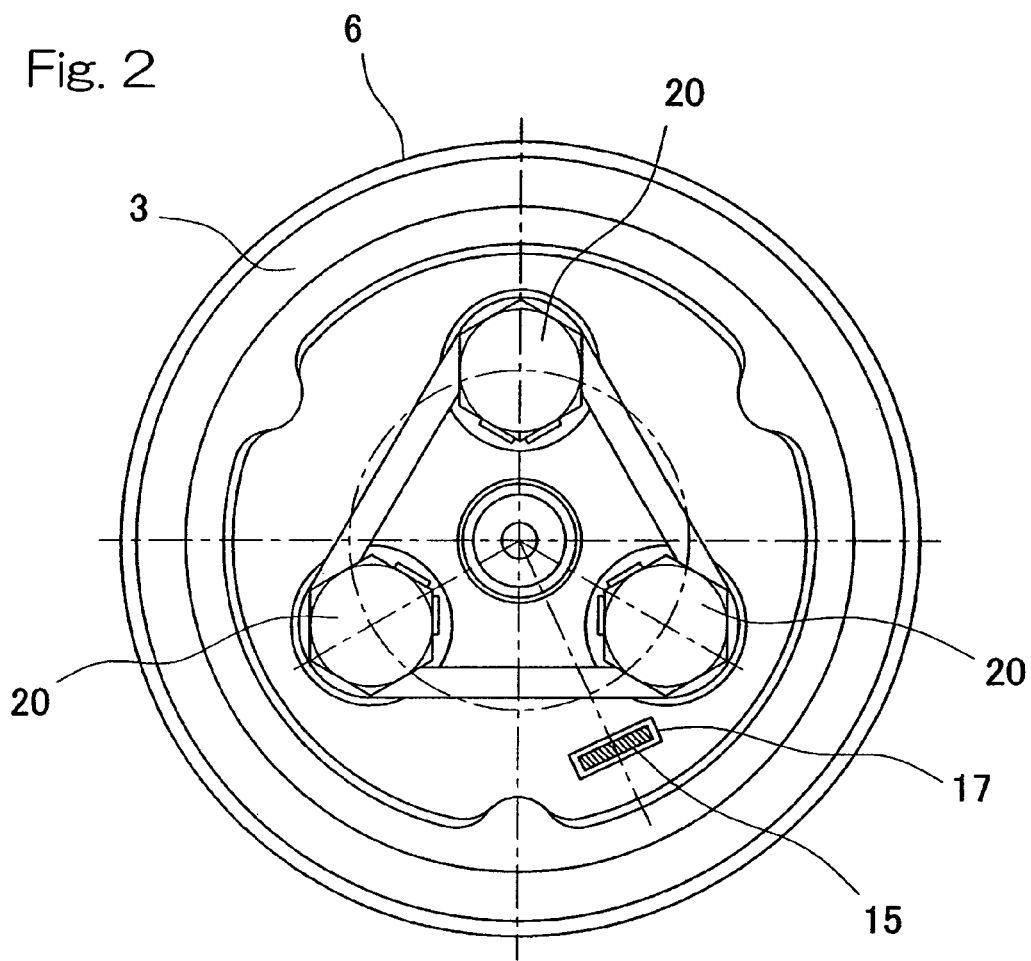
FIG. 2 is a front elevational view of the bearing unit.
Figure 3:
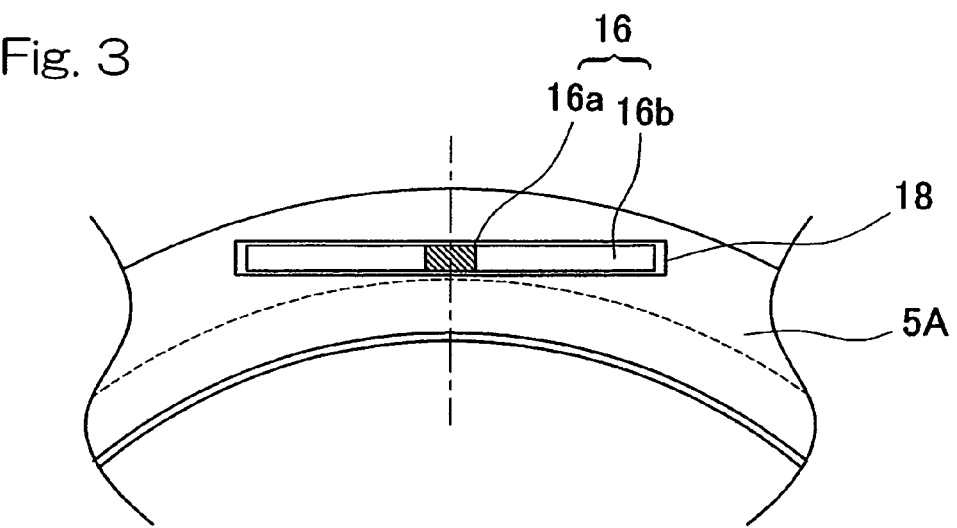
FIG. 3 is a transverse sectional view of the bearing unit.

The first preferred embodiment of the present invention will be described with reference to FIGS. 1 to 3. This IC tag equipped bearing unit is used for the support of an axle 19 of a railway vehicle and includes a bearing 1, and a housing 14, a pair of slingers 2 and 2 and front and rear covers 3 and 4, which form respective bearing unit forming component parts. The front and rear covers 3 and 4 are used to cover axially spaced front and rear end faces of the bearing 1. The bearing 1 is in the form of a roller bearing and, more specifically, a multi-row tapered roller bearing and includes split type inner races 5 one for each row of rollers 7 and 7, a unitary outer race 6, the rollers 7 and 7, retainers 8, and an inner race spacer 9 interposed between a pair of split inner race members 5A and 5A forming the inner race 5.

The slingers 2 is a member fitted to an outer diametric surface of the axle 19 and has an outer periphery, with which respective sealing members 10 such as, for example, oil seals engage slidingly and provided in contact with respective ends of the inner race 5 of the bearing 1. Each of the sealing members 10 is fitted to an inner periphery of a seal covering 11 of a ring-shaped configuration fitted to each end of the outer race 6 so as to protrude axially outwardly. The rear cover 4 is fitted rearwardly of the bearing 1, that is a portion of the axle 19 on one side adjacent a center of the axle 19 in an axial direction of the axle 19, with one of the slingers 2 sandwiched between this rear cover 4 and the inner race 5. The sealing member 10 fitted to the seal covering 11 at one end of the outer race 6 slidingly engage an outer periphery of this slinger 2. The seal covering 11 has a free end loosely engaged in an annular groove 4a defined in an end face of the rear cover 4, thereby forming a labyrinth seal. The front cover 3 is disposed so as to cover an end of the axle 19, with the other slinger 2 sandwiched axially between this front cover 3 and the inner race 5. The sealing member 10 fitted to an inner periphery of the other seal covering 11 on the other end of the outer race 6 slidingly engages an outer periphery of this slinger 2. The seal covering 11 has a free end loosely engaged in an annular groove 3a defined in an end face of the front cover 3, thereby forming a labyrinth seal.

The slingers 2 and 2 and the front and rear covers 3 and 4, which are the respective bearing unit forming component parts, are fixed to the axle 19 by means of bolts 20 together with the inner race 5 of the bearing. The outer race 10 is press-fitted into an inner periphery of the housing 14.

A portion of a front surface of the front cover 3, which is one of the bearing unit forming component parts, is fitted with an RFID based IC tag 15. This IC tag 15 is of a type capable of reading and writing one at a time and is recorded with information of the specification of the bearing 1 and maintenance information such as, for example, date of inspection and history of use. Mounting of this IC tag 15 is carried out through an electric insulating element 17 made of a synthetic resin as shown in FIG. 2. Thereby, even though the front cover 3, which is a fitting area of the IC tag 15, is made of a metallic material, it is possible to avoid the possibility that reading becomes impossible during the reading of information by means of microwaves as a result of the microwaves being absorbed by the front cover 3.

Figure 1:
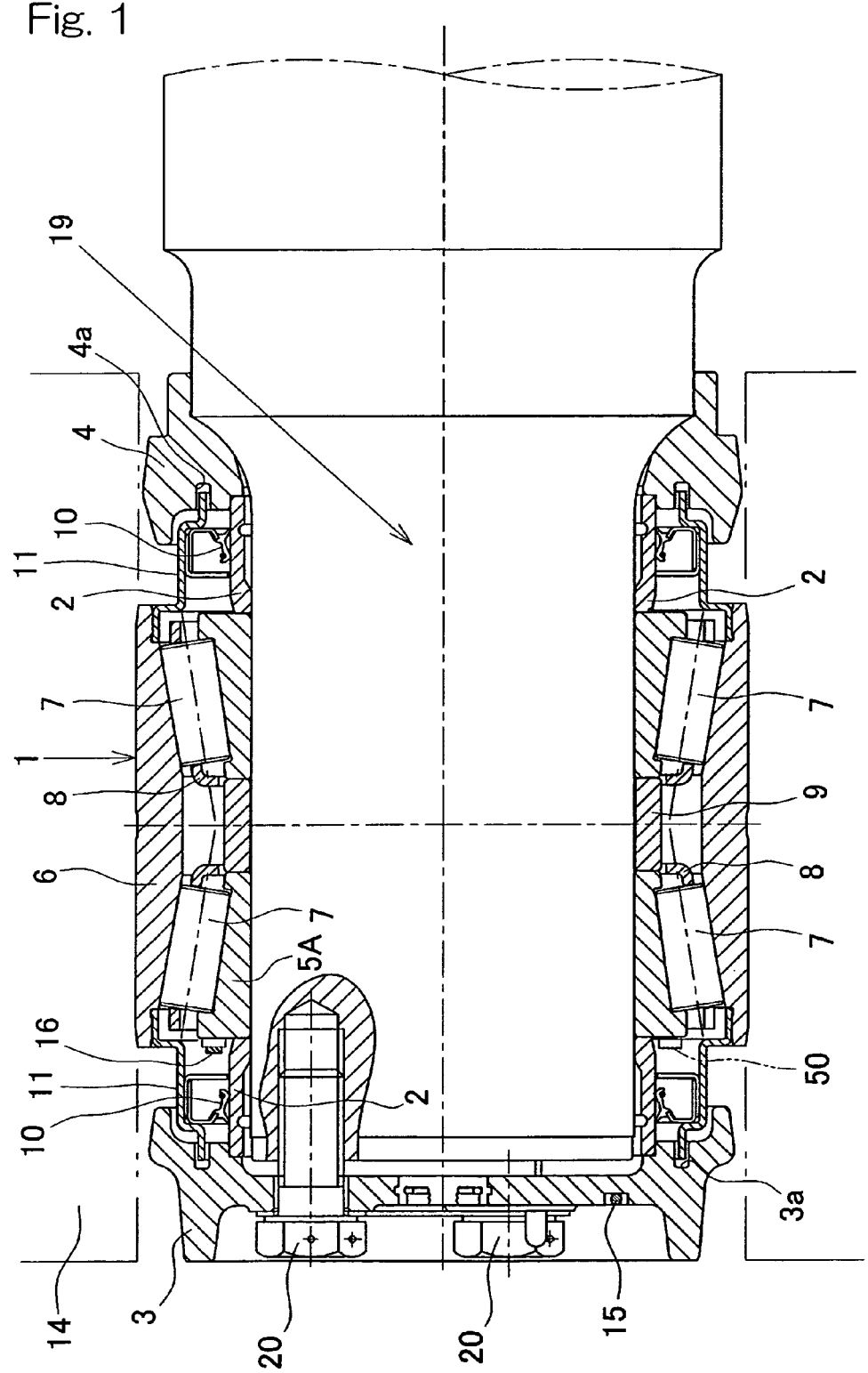
FIG. 1 is a longitudinal sectional view of an IC tag equipped bearing unit according to a first preferred embodiment of the present invention.

In the bearing 1 shown in FIG. 1, another RFID based IC tag 16 is fitted to an front end face of the split inner race member 5A thereof. This IC tag 16 is of a read-only type and is recorded with information necessary to correlate the bearing unit forming component part (the front cover 3), to which the IC tag 15 is fitted, with the bearing 1. This correlating information may be, for example, an identification information of the bearing 1 or any other suitable information. Mounting of this IC tag 16 is similarly carried out through an electric insulating element 18 made of a synthetic resin as shown in FIG. 3. The IC tag 16 includes an IC chip 16a and an antenna 16b. It is to be noted that the IC tag 15 fitted to the front cover 3 is of a structure generally similar to that of the IC tag 16.

Figure 10:
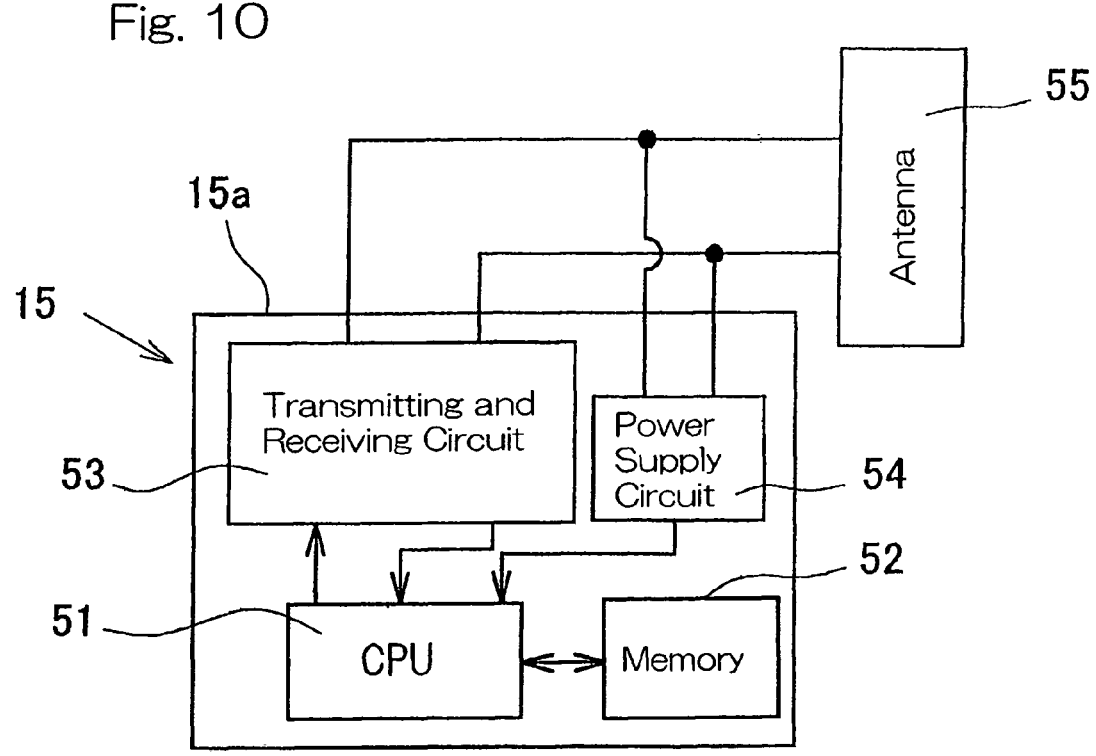
FIG. 10 is a block diagram showing an example of a circuit construction of the IC tag.

FIG. 10 illustrates an example of the circuit structure of the IC tag 15 of a type capable of reading and writing one at a time. This IC tag 15 is in the form of, for example, an IC chip and includes a central processing unit (CPU) 51, a memory 52, a transmitting and receiving circuit 53 and a power supply circuit 54. The power supply circuit 54 is of a type capable of acquiring an electric power through an antenna 55. The memory 52 is used of a type that does not require an electric power for the storage of information. The antenna 55 may be provided on a substrate common to the IC chip or may be provided in the IC chip.

According to the IC tag equipped bearing unit of the foregoing construction, even after the bearing 1 shown in FIG. 1 has been assembled, the specification information of the bearing 1 can easily be read out from the IC tag 15 fitted to the front surface of the front cover 3, which is one of the bearing unit forming component parts, while in a condition so assembled. Also, from this IC tag 15, the maintenance information such as, for example, the date of inspection and the history of use of the bearing 1 can be read out. For this reason, the workability in maintenance of the bearing 1 can increase. Also, since the IC tag 15 is of a read/write type, it is possible to rewrite and/or additionally record the maintenance information each time the maintenance is performed, so that the bearing history can be kept up-to-date, resulting in further increase of the workability in maintenance.

Also, since the IC tag 16 fitted to the bearing inner race 5 is recorded with information necessary to correlate the bearing unit forming component part (the front cover 3) and the bearing 1, when the correlating information is to be read out from the IC tag 16 of the bearing 1 when re-assemblage is performed after disassembly, the correlation with the bearing unit forming component part (the front cover 3) can be ascertained. For this reason, it is possible to alleviate an erroneous incorporation of the bearing 1.

Figure 4:
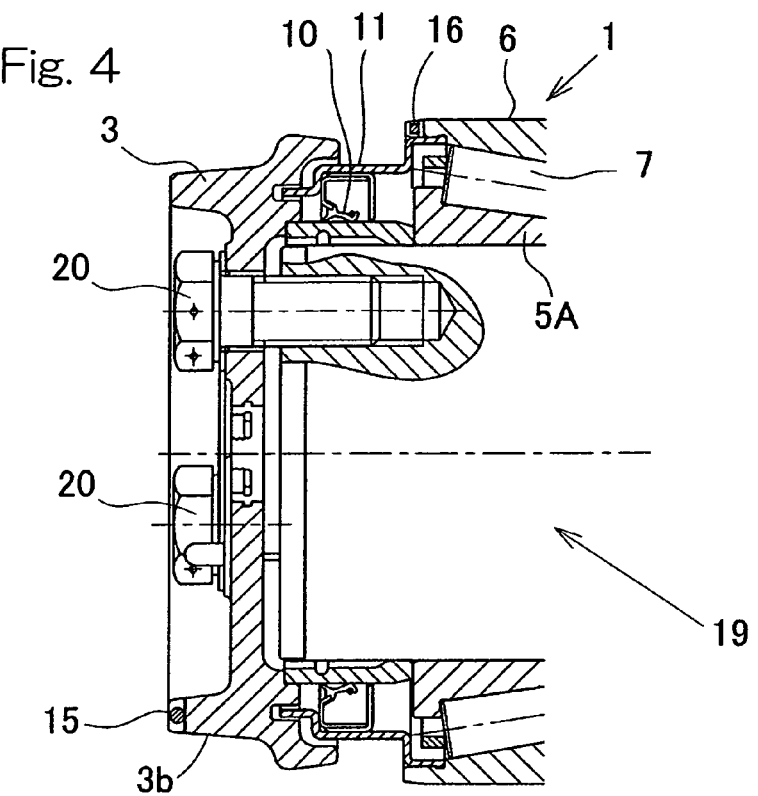
FIG. 4 is a fragmentary longitudinal sectional view of the IC tag equipped bearing unit according to a second preferred embodiment of the present invention.
Figure 5:
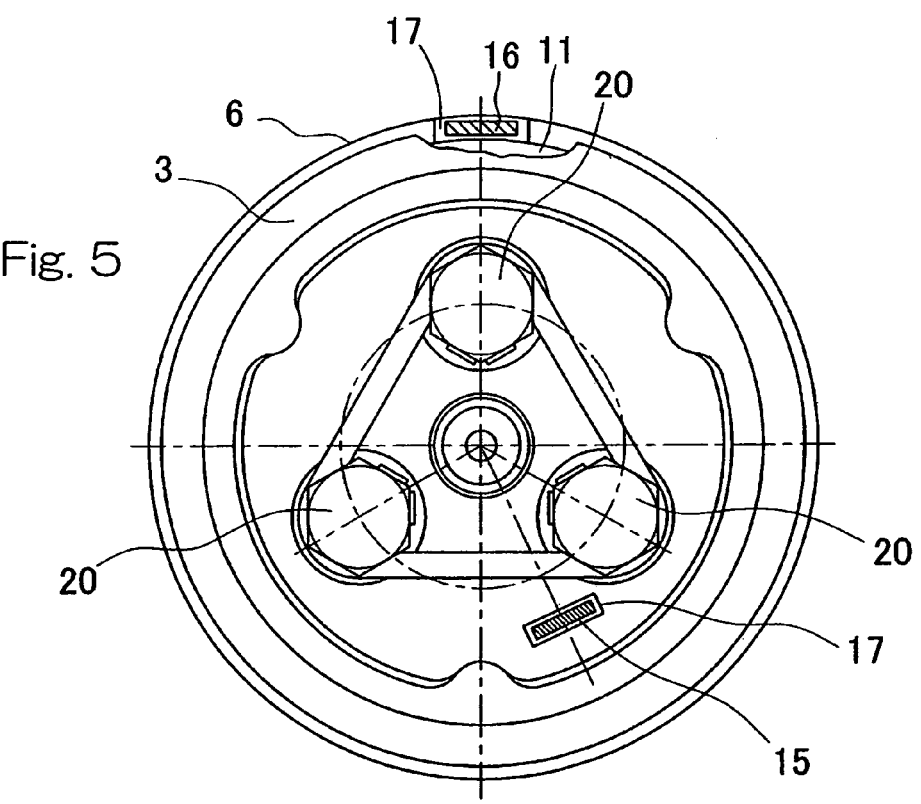
FIG. 5 is a front elevational view of the bearing unit.

It is to be noted that although in the foregoing first embodiment, the IC tag 15 has been shown and described as fitted to the front surface of the front cover 3 and the other IC tag 16 has been shown and described as fitted to the end face of the bearing inner race 5, this is not always essential and the IC tag 15 may be fitted to, for example, an outer edge portion 3b of the front cover 3 as is the case with a second embodiment shown in FIG. 4 and the other IC tag 16 may be fitted to an end face of the bearing outer race 6 as shown in FIG. 5. Also, the bearing unit forming component part, to which the IC tag 15 shown in FIG. 1 is fitted, may not be always limited to the front cover 3, but may be the rear cover 4, the seal covering 11 or the housing 14.

Also, although in any one of the first and second embodiments the IC tag 15 fitted to the front cover 3, which is the bearing unit forming component part, has been described of the read/write type, an IC tag of a read-only type can be employed in place thereof. In such case, it is necessary that an identification symbol of the IC tag must be recorded in this IC tag 15 and, at the same time, a table, in which this identification symbol and the maintenance information are correlated with each other, must be prepared in a different information processing device such as, for example a personal computer. If the correlation table, in which the identification symbol and the maintenance information are correlated with each other, is prepared in the manner so described above, the maintenance information of the bearing 1 corresponding to the identification symbol recorded in the correlation table is rewritten or additionally recorded for each cycle of maintenance, the up-to-date history of the bearing can be obtained from this table at all times.

In addition, in any one of the first and second embodiments, the use of the IC tag 16 may be dispensed with, and a marking 50, shown by the double dotted chain line, which is descriptive of a combination of the bearing unit forming component part (the front cover 3), to which the IC tag 15 has been fitted, with the bearing 1 may be applied to the baring 1 and, at the same time, information of such marking be recorded in the IC tag 15. The marking 50 may be, for example, an engraved marking and is indicative of identification information or the like of the bearing 1.

Even where as described above, the marking 50 for correlation is provided, the bearing 1 having the marking 50 applied thereto can be correctly combined with the corresponding bearing unit forming component part, when the information of the marking 50 can be read out from the IC tag 15, thereby alleviating an erroneous incorporation of the bearing 1.

FIGS. 6 to 9 illustrates a third preferred embodiment of the present invention. This IC tag equipped bearing unit used in a roll neck of a rolling machine and is provided in each of roll necks of a double tier system. Bearings 21 are each in the form of a multi-row tapered roller bearing and, more specifically, four row bearing, in which a respective inner race 25 is comprised of two split inner race members 25A and 25A juxtaposed to each other. An outer race 26 includes an intermediate split outer race member 26A, corresponding to intermediate two rows of rollers, and a pair of end split outer race members 26B corresponding to outer two rows of rollers, which are juxtaposed to each other. An outer race spacer 29 is provided between the neighboring split outer race member 26A and 26B. The rollers 27 are in the form of a tapered roller and are interposed between the inner race 25 and the outer race 26. A retainer 28 is provided for each row of the rollers.

The outer race is inserted into an inner diametric surface of a housing 34, and the housing 34 has front and rear ends to which front and rear covers 23 and 24 are fixed by means of bolts 40 (FIG. 7), respectively. The outer race 26 is sandwiched between the front cover 23 and the rear cover 24 and is therefore axially regulated in position. The inner race 25 is fixed on a rotary shaft 39 by urging a step 39a, formed in an outer diametric surface of a rotary shaft 39 received inside the inner race 25, against an end face of one split inner race member 26A and, also urging a nut (not shown), threadingly mounted on an outer diametric circle of the rotary shaft 39, against an end face of the other split inner race member 26A.

Figure 6:
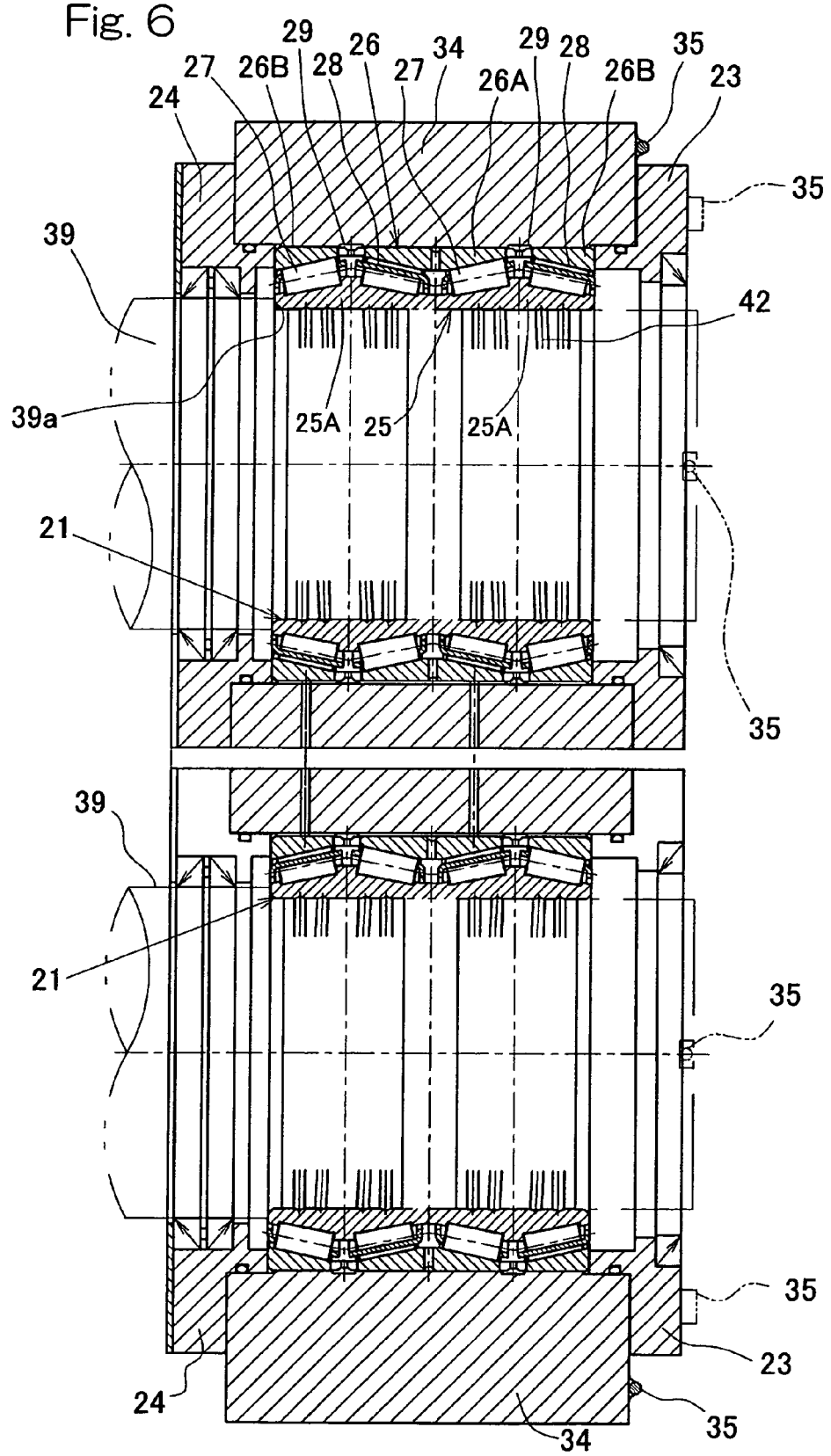
FIG. 6 is a fragmentary longitudinal sectional view of the IC tag equipped bearing unit according to a third preferred embodiment of the present invention.
Figure 7:
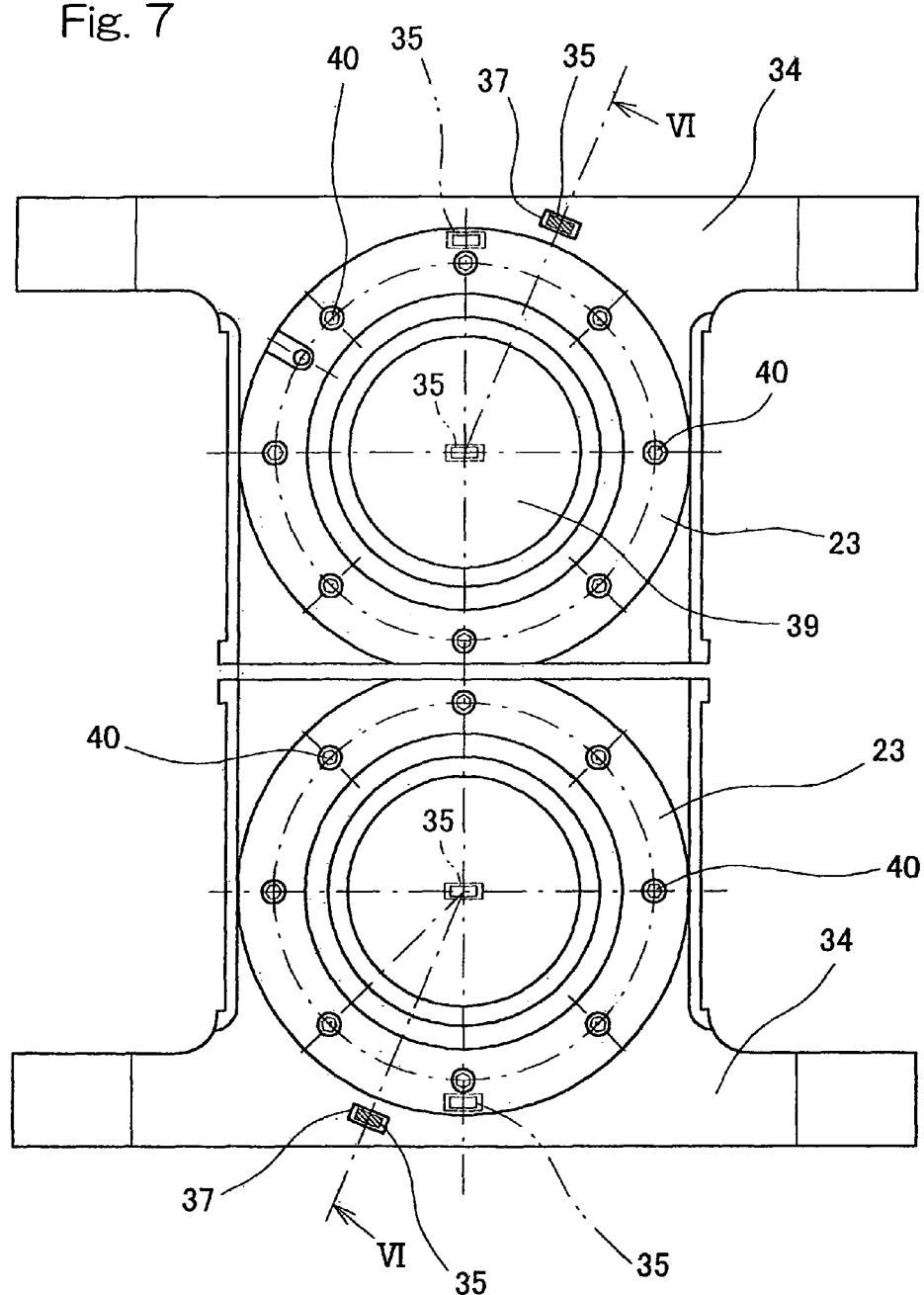
FIG. 7 is a front elevational view of the bearing unit.

A portion of a front surface of the housing 34, to which the front cover 23 is fixed, is fitted with an RFID based IC tag 35 as shown by the solid line in FIGS. 6 and 7. It is to be noted that FIG. 6 illustrates a sectional view as viewed by the cutting plane line VI-VI in FIG. 7. The IC tag 35 is of a type capable of reading and writing one at a time and is recorded with information of the specification of the bearing 21 and maintenance information such as, for example, date of inspection and history of use. Mounting of this IC tag 35 is carried out through an electric insulating element 37 made of a synthetic resin as shown in FIG. 7. Thereby, even though the housing 34, which is a fitting area of the IC tag 35, is made of a metallic material, it is possible to avoid the possibility that reading becomes impossible during the reading of information by means of microwaves as a result of the microwaves being absorbed by the housing 34.

Figure 8:
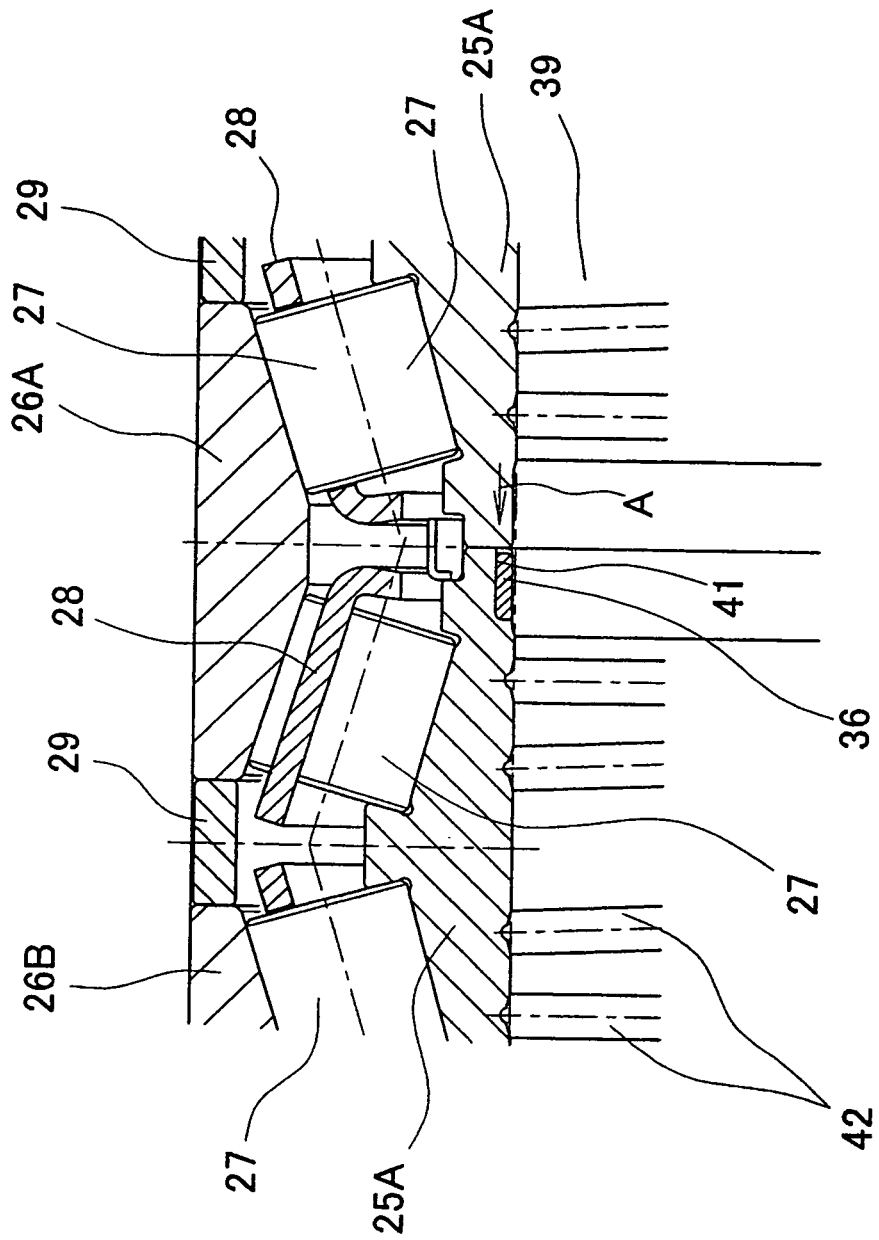
FIG. 8 is a fragmentary enlarged sectional view of the bearing unit.
Figure 9:
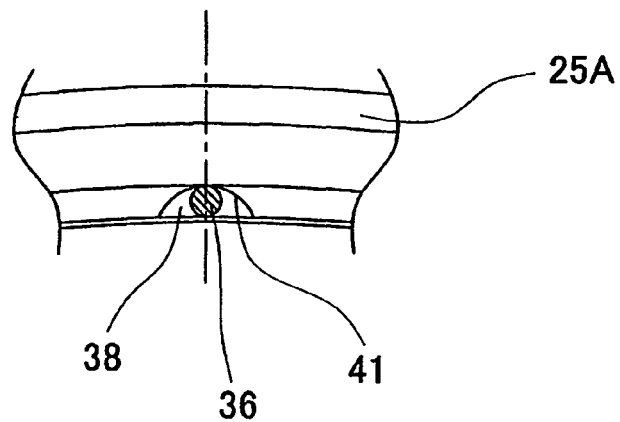
FIG. 9 is a front elevational view of an IC tag fitting area as viewed in a direction shown by the arrow A in FIG. 8.

As shown in a fragmentary enlarged diagram of FIG. 8, another RFID based IC tag 36 is fitted to one end of the split inner race member 25A in the bearing 21, which is abutted with the other split inner race member 25A. Mounting of this IC tag 36 is carried out to an inner diametric surface of the inner race 25 as shown in FIG. 9, showing a font elevational view as viewed in a direction shown by the arrow A in FIG. 8. In the example shown therein, a first groove 41 is formed in an inner diametric surface of the end of the split inner race member 25A so as to extend axially, and the IC tag 36 is fixed in position inside this groove 41 through an insulating element 38 made of a resinous material. Alternatively, the IC tag 36 is fixed inside a first groove 42 formed in the inner diametric surface of the inner race 25 so as to extend spirally. The first groove 41 referred to above and extending axially is a groove for communicating second grooves 42, provided on respective inner diametric surfaces of the split inner race members 25A on both sides so as to extend spirally, with each other. The second grooves 42 are, for example, grease circulating grooves for creep deformation countermeasure. In other words, since in the bearing unit for the roll necks of the rolling machine, it is incorporated with a gap generally formed between it and the roll shaft 39, a creep deformation (a phenomenon in which slippage occurs between the bearing inner race 25 and the shaft 39) occurs at the shaft 39 and the bearing inner race 25 during the operation. As a countermeasure thereto, the grooves 42 through which the grease is circulated are provided in the bearing inner diametric surface. The IC tag 36 is fitted by the utilization of the second grooves 42 or the first groove 41 for communicating them with each other.

This IC tag is of a read-only type and is recorded with information of the bearing that is necessary to correlate the bearing unit forming component part (the housing 34), to which the IC tag 35 is fitted, with the bearing 21, for example, an identification information of the bearing 21.

Even in this IC tag equipped bearing unit, even after the bearing 21 has been assembled, the specification information of the bearing 21 can easily be read out from the IC tag 35 fitted to the front surface of the housing 34, which is the bearing unit forming component part, while in a condition so assembled. Also, since from this IC tag 35, the maintenance information such as, for example, the date of inspection and the history of use of the bearing 21 can be read out, the workability in maintenance of the bearing 21 can increase. Also, since the IC tag 35 is of a read/write type, it is possible to rewrite and/or additionally record the maintenance information each time the maintenance is performed, so that the bearing history can be kept up-to-date, resulting in further increase of the workability in maintenance.

Also, since the IC tag 36 fitted to the bearing inner race 25 is recorded with information necessary to correlate the bearing unit forming component part (the housing 34) and the bearing 21, when the correlating information is to be read out from the IC tag 36 of the bearing 21 when re-assemblage is performed after disassembly, the correlation with the bearing unit forming component part (the housing 34) can be ascertained. For this reason, it is possible to alleviate an erroneous incorporation of the bearing 21.

It is to be noted that although in this embodiment the housing 34 has been described as chosen as the bearing unit forming component part, to which the IC tag 35 is fitted, this is not always essential and, as shown by the double dotted chain line in FIGS. 6 and 7, it may be fitted to a front surface of the front cover 23 or a front end of the rotary shaft 39.

What is claimed is:

1. An IC tag equipped bearing unit comprising
a bearing; and
bearing unit forming component parts comprising:
a housing having the bearing incorporated therein;
a shaft supported by the bearing, the shaft being an axle of a railway vehicle or a rotary shaft in a roll neck of a rolling machine;
covers covering axially spaced end faces of the bearing; and
a sealing member for the housing,
wherein a read/write type IC tag is fitted to at least one of the bearing unit forming component parts,
wherein the bearing is provided with a read-only type IC tag,
wherein the read/write type IC tag fitted to the bearing unit forming component part is recorded with maintenance information including date of inspection of the bearing and history of use of the bearing, and
wherein identification information of the bearing necessary to correlate the bearing and the bearing unit forming component part to which the read/write type IC tag is fitted, is recorded on the read-only type IC tag fitted to the bearing, the identification information being adapted to be read out when the bearing unit once disassembled is re-assembled.

2. The IC tag equipped bearing unit as claimed in claim 1, wherein the IC tag is fitted to the bearing unit forming component part or the bearing through an insulating element.

* * * * *